United States Patent
Hatada

(10) Patent No.: US 12,292,621 B2
(45) Date of Patent: May 6, 2025

(54) OPTICAL SYSTEM AND IMAGE PICKUP APPARATUS

(71) Applicant: CANON KABUSHIKI KAISHA, Tokyo (JP)

(72) Inventor: Takahiro Hatada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/592,657

(22) Filed: Mar. 1, 2024

(65) Prior Publication Data
US 2024/0201470 A1 Jun. 20, 2024

Related U.S. Application Data

(63) Continuation of application No. 17/097,108, filed on Nov. 13, 2020, now Pat. No. 11,971,607.

(30) Foreign Application Priority Data

Dec. 11, 2019 (JP) .................................. 2019-223914

(51) Int. Cl.
*G02B 9/12* (2006.01)
*G02B 27/00* (2006.01)

(52) U.S. Cl.
CPC ........... *G02B 9/12* (2013.01); *G02B 27/0025* (2013.01)

(58) Field of Classification Search
CPC ... G02B 9/12; G02B 9/34; G02B 9/60; G02B 13/04
See application file for complete search history.

(56) References Cited

U.S. PATENT DOCUMENTS

| 9,036,265 B2 | 5/2015 | Hatada |
| 9,684,155 B2 | 6/2017 | Hatada |
| 10,120,170 B2 | 11/2018 | Hatada |
| 11,782,251 B2 | 10/2023 | Hatada |
| 2016/0062096 A1* | 3/2016 | Hatada ............... G02B 27/0025 348/240.3 |
| 2019/0004295 A1 | 1/2019 | Hatada |

(Continued)

FOREIGN PATENT DOCUMENTS

| JP | 2004-333572 A | 11/2004 |
| JP | 2011-107269 A | 6/2011 |

(Continued)

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*

(Continued)

*Primary Examiner* — Cara E Rakowski
(74) *Attorney, Agent, or Firm* — Carter, DeLuca & Farrell LLP

(57) ABSTRACT

An optical system with a fixed focal length includes a front lens unit closest to an object, a rear lens unit having a negative refractive power closest to an image plane, and a middle unit having a positive refractive power as a whole, including one or more lens units, and disposed between the front lens unit and the rear lens unit. A distance between adjacent lens units changes during focusing. The rear lens unit includes two or more positive lenses. A predetermined condition is satisfied.

16 Claims, 7 Drawing Sheets

(56) References Cited

U.S. PATENT DOCUMENTS

| | | |
|---|---|---|
| 2019/0079305 A1 | 3/2019 | Ichimura |
| 2019/0271830 A1* | 9/2019 | Mori .................. G02B 13/0035 |
| 2020/0033562 A1 | 1/2020 | Tomioka |
| 2020/0132974 A1 | 4/2020 | Kimura et al. |
| 2020/0257095 A1 | 8/2020 | Kimura et al. |
| 2020/0319436 A1 | 10/2020 | Hatada |
| 2020/0341248 A1 | 10/2020 | Iwamoto |
| 2021/0124182 A1* | 4/2021 | Ishibashi ................ G02B 13/02 |
| 2022/0244508 A1 | 8/2022 | Hatada |
| 2023/0020736 A1 | 1/2023 | Hatada |
| 2023/0213732 A1 | 7/2023 | Hatada |

FOREIGN PATENT DOCUMENTS

| | | |
|---|---|---|
| JP | 2013-003240 A | 1/2013 |
| JP | 2013-246381 A | 12/2013 |
| JP | 2015-28530 A | 2/2015 |
| JP | 2015-111185 A | 6/2015 |
| JP | 2015-166834 A | 9/2015 |
| JP | 2019-74631 A | 5/2019 |
| JP | 2019-101180 A | 6/2019 |
| JP | 2020-016787 A | 1/2020 |
| WO | 2018/139160 A1 | 8/2018 |

OTHER PUBLICATIONS

Notice of Reasons for Rejection issued by the Japanese Patent Office on Aug. 15, 2023 in corresponding JP Patent Application No. 2019-223914, with English translation.

* cited by examiner

OPTICAL SYSTEM AND IMAGE PICKUP APPARATUS

CROSS REFERENCE TO RELATED APPLICATIONS

This application is a continuation of U.S. patent application Ser. No. 17/097,108, filed on Nov. 13, 2020, which claims the benefit of and priority to Japanese Patent Application No. 2019-223914, filed Dec. 11, 2019, each of which is hereby incorporated by reference herein in their entirety.

BACKGROUND OF THE INVENTION

Field of the Invention

The present invention relates to an optical system suitable for an imaging optical system used for an image pickup apparatus, such as a digital camera.

Description of the Related Art

This optical system is required to have a high image quality (high resolution) and good image blurs, and to be able to satisfactorily correct various aberrations such as a chromatic aberration. Japanese Patent Laid-Open No. ("JP") 2019-74631 discloses an optical system having a large aperture ratio, which includes, in order from an object side to an image side, a first lens unit having a positive refractive power and a second lens unit having a positive refractive power, wherein the first lens unit moves during focusing. JP 2019-101180 discloses an optical system having a large aperture ratio, which includes, in order from the object side to the image side, a first lens unit having a positive or negative refractive power, a second lens unit having a positive refractive power, and a third lens unit having a positive refractive power, wherein the second lens unit moves during focusing.

These optical systems with a large aperture ratio have a shallow depth of field. Thus, various aberrations, such as a longitudinal chromatic aberration, a lateral chromatic aberration, a spherical aberration, a coma, and an astigmatism, significantly affect the image quality.

However, it is difficult for the optical systems disclosed in JPs 2019-74631 and 2019-101180 to correct the lateral chromatic aberration because a material having a high refractive index is used for the second lens unit.

SUMMARY OF THE INVENTION

The present invention provides an optical system having a large aperture ratio that can satisfactorily correct various aberrations.

An optical system according to one aspect of the present invention includes a front lens unit closest to an object, a rear lens unit having a negative refractive power closest to an image plane, and a middle unit having a positive refractive power as a whole, including one or more lens units, and disposed between the front lens unit and the rear lens unit. A distance between adjacent lens units changes during focusing. The rear lens unit includes two or more positive lenses. The following conditional expressions are satisfied:

$$-0.40 \leq f/fr < 0.00$$
$$65 \leq vdpl$$
$$0.00 < |fpl/fr| \leq 0.60$$

where f is a focal length of the optical system, fr is a focal length of the rear lens unit, and vdpl and fpl are an Abbe number and a focal length of a positive lens having the largest Abbe number in the rear lens unit, respectively.

An image pickup apparatus according to another aspect of the present invention includes the above optical system, and an image sensor configured to capture an image formed by the optical system.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. FIGS. 1, 4, 7 and 10 illustrate configurations of optical systems according to Examples 1 to 4 of the present invention in the in-focus state on (an object at) infinity, respectively. The optical system according to each example is an optical system used for an image pickup apparatus such as a digital video camera, a digital still camera, a broadcasting camera, a film-based camera, and a surveillance camera, and an optical apparatus such as an interchangeable lens.

In each of the figures, the left side is the object side and the right side is the image side. The optical system according to each example is a fixed focal length lens. The optical system according to each example has a plurality of lens units. A lens unit is a group of one or more lenses that can move or be fixed (cannot move) integrally during focusing. That is, in the optical system according to each example, a distance between lens units adjacent to each other changes during focusing from infinity to a short distance. The lens unit may include an aperture stop (diaphragm).

The optical system according to each example includes, in order from the object side to the image side, a front lens unit Lf having a positive or negative refractive power, a middle (or intermediate) unit Lm having a positive refractive power, and a rear lens unit Lr having a negative refractive power. The middle unit Lm includes all lens units disposed between the front lens unit Lf and the rear lens unit Lr. When the middle unit Lm has two or more lens units, a combined focal length of these lens units may be positive in the in-focus state on infinity. As will be described later, the middle unit in the optical system according to each example includes a lens unit that moves during focusing.

In each figure, Li represents an i-th lens unit (i is a natural number) counted from the object side among the lens units included in the optical system. SP represents an aperture stop (diaphragm). IP represents an image plane for placing an imaging plane of a solid-state image sensor (photoelectric conversion element) such as a CCD sensor and a CMOS sensor in a digital camera or a film plane (photosensitive surface) in a film-based camera.

Figure 1:
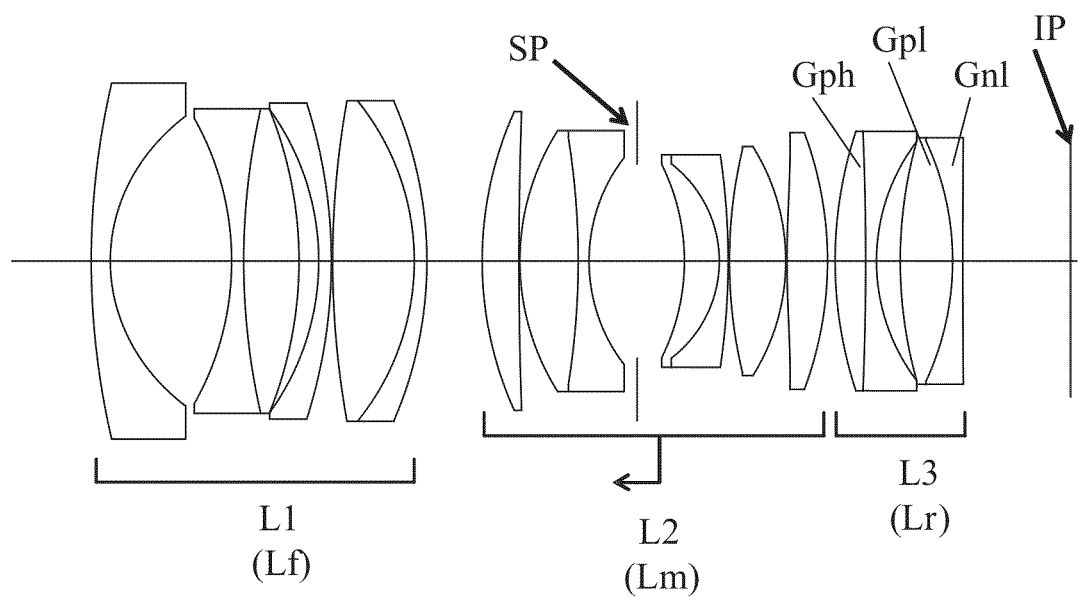
FIG. 1 is a sectional view of an optical system according to Example 1.
Figure 4:
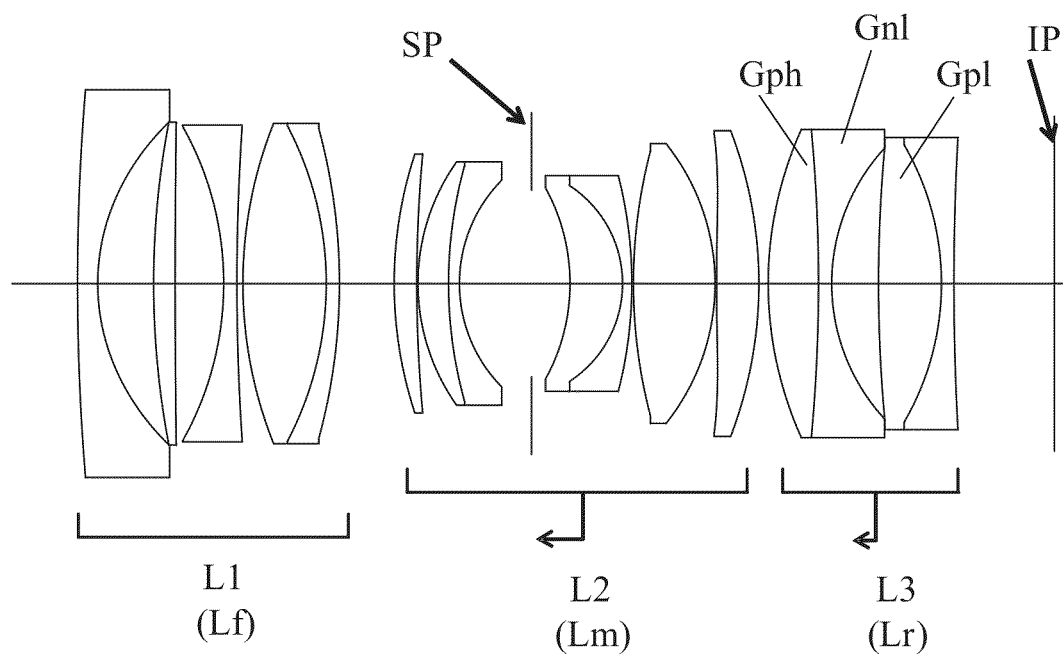
FIG. 4 is a sectional view of an optical system according to Example 2.
Figure 7:
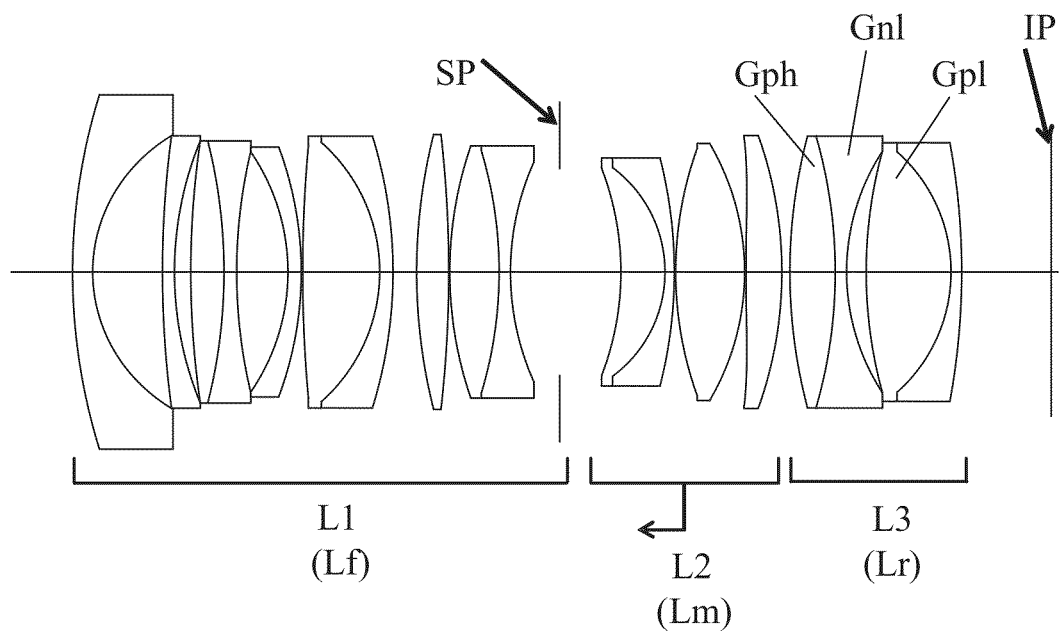
FIG. 7 is a sectional view of an optical system according to Example 3.

In the optical systems according to Examples 1 to 3 illustrated in FIGS. 1, 4 and 7, L1 represents a first lens unit having a positive refractive power, L2 represents a second lens unit having a positive refractive power, and L3 represents a third lens unit having a negative refractive power. The first lens unit L1 corresponds to the front lens unit Lf, the second lens unit L2 corresponds to the middle unit Lm, and the third lens unit L3 corresponds to the rear lens unit Lr. In the optical system according to Example 4 illustrated in FIG. 10, L1 represents a first lens unit having a negative refractive power, L2 represents a second lens unit having a positive refractive power, L3 represents a third lens unit having a positive refractive power, and L4 represents a fourth lens unit having a negative refractive power. The first lens unit L1 corresponds to the front lens unit Lf, the second and third lens units L2 and L3 correspond to the middle unit Lm, and the fourth lens unit L4 corresponds to the rear lens unit Lr.

In the optical systems of Examples 1 and 3, during focusing from infinity to the short distance, the second lens unit L2 moves to the object side as illustrated by an arrow in the figure, and the first lens unit L1 and the third lens unit L3 are fixed. In the optical system according to Example 2, during focusing from infinity to the short distance, the second lens unit L2 and the third lens unit L3 move toward the object side so as to draw different trajectories as illustrated by arrows in the figure, and the first lens unit L1 is fixed. In the optical system according to Example 4, during focusing from infinity to the short distance, the second lens unit L2 and the third lens unit L3 move toward the object side so as to draw different trajectories as illustrated by the arrows in the figure, and the first lens unit L1 and the first lens unit L4 are fixed.

FIGS. 2, 5, 8 and 11 are aberration diagrams of the optical systems according to Examples 1, 2, 3, and 4 in an in-focus state on infinity, respectively. FIGS. 3, 6, 9, and 12 are aberration diagrams of the optical systems according to Examples 1, 2, 3, and 4 in an in-focus state on a short distance (0.28 m), respectively. The spherical aberration diagram illustrates spherical aberration amounts for the d-line (wavelength 587.6 nm) and the g-line (wavelength 435.8 nm). Fno is an F-number. In the astigmatism diagram, dS indicates an astigmatism amount on the sagittal image plane, and dM indicates an astigmatism amount on the meridional image plane. The distortion diagram illustrates a distortion amount for the d-line. The chromatic aberration diagram illustrates a chromatic aberration amount for the g-line. ω is a half angle of view (°).

Next follows a description of a characteristic configuration of the optical system according to each example. The optical system according to each example is characterized in that the rear lens unit Lr having a negative refractive power has two or more positive lenses. By having two or more positive lenses and properly setting the refractive power and the glass material of each positive lens, the lateral chromatic aberration and the Petzval sum are satisfactorily corrected.

The optical system according to each example satisfies the conditions represented by the following expressions (1) to (3):

$$-0.40 \le f/fr < 0.00 \quad (1)$$

$$65 \le vdpl \quad (2)$$

$$0.00 < |fpl/fr| \le 0.60 \quad (3)$$

where f is a focal length of the entire optical system according to each example, fr is a focal length of the rear lens unit Lr, vdpl is an Abbe number of the positive lens Gpl having the largest Abbe number in the rear lens unit Lr, and fpl is a focal length of the positive lens Gpl.

The expression (1) illustrates a condition regarding the focal length fr of the rear lens unit Lr. Satisfying this condition can suppress a fluctuation in coma during focusing. By applying a negative refractive power to the rear lens unit Lr, the optical system can be configured to be nearly symmetrical with respect to the diaphragm, and the coma and lateral chromatic aberration can be easily corrected. The refractive power of the middle unit Lm, which is the main focus unit, can be increased, a moving amount of the middle unit Lm during focusing can be reduced, and fluctuations in coma during focusing can be suppressed.

If the refractive power of the rear lens unit Lr becomes too strong so that f/fr is lower than the lower limit of the expression (1), the refractive power of the middle unit Lm becomes too strong and it becomes difficult to correct the spherical aberration. The position of the entrance pupil moves to the image side, which makes it difficult to secure the telecentricity of the incident light flux on the image plane IP. If the refractive power of the rear lens unit Lr becomes too weak so that f/fr is higher than the upper limit of the expression (1), the refractive power of the middle unit Lm becomes too weak and the moving amount of the middle unit Lm during focusing increases. As a result, it becomes difficult to shorten the overall length of the optical system.

The expression (2) illustrates a condition regarding the Abbe number of the positive lens Gpl, which has the largest Abbe number in the rear lens unit Lr. The expression (3) illustrates a condition relating to the refractive power of the positive lens Gpl. By satisfying these conditions, the longitudinal and lateral chromatic aberrations can be satisfactorily corrected. If the refractive power of the positive lens Gpl becomes too strong so that |fpl/fr| is lower than the lower limit of the expression (3), it becomes difficult to correct the chromatic aberration in the rear lens unit Lr, and the fluctuation of the lateral chromatic aberration during focusing becomes large. If the refractive power of the positive lens Gpl becomes too weak so that |fpl/fr| is higher than the upper limit of the expression (3), it becomes difficult to satisfactorily correct the lateral chromatic aberration.

In this way, satisfying the conditions of the expressions (1) to (3) can realize a compact optical system capable of satisfactorily correcting various aberrations such as the lateral chromatic aberration while having a wide angle and a large aperture ratio.

The numerical ranges of the expressions (1) to (3) may be set to ranges illustrated in the following expressions (1a) to (3a):

$$0.35 \le f/fr \le 0.05 \quad (1a)$$

$$74 \le vdpl \quad (2a)$$

$$0.10 \le |fpl/fr| \le 0.55 \quad (3a)$$

The numerical ranges of the expressions (1) to (3) may be set to ranges illustrated in the following expressions (1b) to (3b).

$$0.30 \le f/fr \le 0.10 \quad (1b)$$

$$80 \le vdpl \quad (2b)$$

$$0.20 \le |fpl/fr| \le 0.50 \quad (3b)$$

Next follows a description of a configuration in which the optical system according to each example may be satisfied. First, the front lens unit Lf may have a negative lens closest to the object. Using the lens closest to the object as a negative lens can easily correct a curvature of field and sagittal coma flare. Since the diameter of the lens closest to the object can be reduced, the diameter and weight of the optical system can be easily reduced.

Second, the rear lens unit Lr may have four or more lenses. When the rear lens unit Lr has four or more lenses, the number of lenses in the middle unit Lm, which is the main focus unit, can be reduced, and quick autofocusing becomes available. By disposing a large number of lenses in a place where the height of off-axis light rays is high, it becomes easy to correct the curvature of field and distortion.

Third, the front lens unit Lf may have four or more lenses. When the front lens unit Lf has four or more lenses, the number of lenses can be reduced in the middle unit Lm, which is the main focus unit, and quick autofocusing becomes available. By disposing a large number of lenses in a place where the height of off-axis light rays is high, it becomes easy to correct the curvature of field and distortion.

Next follows a description of conditions which the optical system according to each example may satisfy. In the following description, ndph is a refractive index of the positive lens Gph having the largest refractive index in the rear lens unit Lr. fm is a focal length of the middle unit Lm. When the middle unit Lm includes a plurality of lens units, the value of fm is the combined focal length of all the lens units in the middle unit Lm in the in-focus state on infinity. ff is a focal length of the front lens unit Lf. sk is a backfocus of the optical system in the in-focus state on an object at infinity. vdnl is an Abbe number of the negative lens Gnl having the smallest Abbe number in the rear lens unit Lr. The rear lens unit Lr has an air lens having a negative refractive power, R1 is a radius of curvature of the surface on the object side of the air lens, and R2 is a radius of curvature of the surface on the image side of the air lens. The optical system according to each example may satisfy at least one of the conditions of the following expressions (4) to (9).

$$1.85 \le ndpl \le 2.10 \quad (4)$$

$$1.0 \le fm/f \le 2.0 \quad (5)$$

$$0.00 < |f/ff| \le 0.40 \quad (6)$$

$$0.00 < |sk/fr| \le 0.20 \quad (7)$$

$$25 \le vdnl \le 50 \quad (8)$$

$$-10.0 \le (R1+R2)/(R1-R2) < 0.0 \quad (9)$$

The expression (4) illustrates a condition regarding the refractive index of the positive lens Gph having the largest refractive index in the rear lens unit Lr. By satisfying this condition, the curvature of field can be easily corrected. If ndpl is too low and lower than the lower limit of the expression (4), it becomes difficult to reduce the Petzval sum, and the curvature of field tends to be undercorrected. If ndpl becomes too high and higher than the upper limit of the expression (4), the negative lens in the rear lens unit Lr tends to have a high dispersion due to the correction of the chromatic aberration in the rear lens unit Lr, and the glass material has a large secondary dispersion. As a result, it becomes difficult to correct the lateral chromatic aberration.

The expression (5) illustrates a condition regarding the combined focal length of the middle unit Lm. Satisfying this condition can suppress aberration fluctuations during focusing. If the refractive power of the middle unit Lm becomes too strong so that fm/f is lower than the lower limit of the expression (5), it becomes difficult to correct the spherical aberration. If the refractive power of the middle unit Lm becomes too weak so that fm/f is higher than the upper limit of the expression (5), the moving amount of the middle unit Lm during focusing increases, and it becomes difficult to shorten the overall length of the optical system.

The expression (6) is a condition relating to the refractive power of the front lens unit Lf. By satisfying this condition, the longitudinal light beam incident on the focus unit can be brought closer to the afocal ray, and the aberration fluctuations during focusing can be suppressed. If the refractive power of the front lens unit Lf becomes too strong on the negative side so that |f/ff| is higher than the upper limit of the expression (6), the lens diameter of the middle unit Lm becomes too large and the main focus lens unit becomes heavy. As a result, quick autofocusing becomes difficult. In addition, it becomes difficult to correct the longitudinal chromatic aberration and spherical aberration. If the refractive power of the front lens unit Lf becomes too strong on the positive side so that |f/ff| is higher than the upper limit of the expression (6), the refractive power of the middle unit Lm becomes weak and the moving amount during focusing becomes large. In addition, it becomes difficult to shorten the overall length of the optical system. Moreover, it becomes difficult to correct the longitudinal chromatic aberration and spherical aberration.

The expression (7) illustrates a condition regarding a ratio of the focal length of the rear lens unit Lr to the backfocus sk of the optical system in the in-focus state on an object at infinity. Satisfying this condition can suppress fluctuations in coma during focusing. By providing a negative refractive power to the rear lens unit Lr, the optical system can be configured to be nearly symmetrical with respect to the diaphragm, and the coma and lateral chromatic aberration can be easily corrected. The refractive power of the middle unit Lm, which is the main focus unit, can be increased, and the moving amount of the middle unit Lm during focusing can be reduced. As a result, coma fluctuations can be suppressed during focusing.

If the refractive power of the rear lens unit Lr becomes too weak so that |sk/fr| is lower than the lower limit of the expression (7), it becomes difficult to reduce the diameter of the lens closest to the image plane. In addition, the symmetry of the refractive power arrangement of the optical system is broken and it becomes difficult to correct the curvature of field. If the refractive power of the rear lens unit Lr becomes too strong so that |sk/fr| is higher than the upper limit of the expression (7), the position of the entrance pupil moves to the image side, and it is difficult to secure the telecentricity of the luminous flux incident on the image plane IP.

The expression (8) illustrates a condition regarding the Abbe number of the negative lens Gnl, which has the smallest Abbe number in the rear lens unit Lr. Satisfying this condition can easily correct the lateral chromatic aberration. If vdnl becomes too small and lower than the lower limit of the expression (8), the glass material has a large secondary dispersion and it becomes difficult to correct the lateral chromatic aberration. If vdnl becomes too large and higher than the upper limit of the expression (8), the glass material having a relatively high refractive index is to be selected in selecting the glass material having the small secondary dispersion so as to correct the lateral chromatic aberration. As a result, it becomes difficult to reduce the Petzval sum, and the curvature of field tends to be undercorrected.

The expression (9) is a condition relating to a shape factor of an air lens having a negative refractive power in the rear lens unit Lr. By satisfying this condition, the curvature of field and sagittal flare can be satisfactorily corrected. If the refractive power of the air lens becomes too weak so that (R1+R2)/(R1−R2) is lower than the lower limit of the expression (9), it becomes difficult to reduce the Petzval sum, and the curvature of field tends to be undercorrected. If the refractive power of the air lens becomes too strong so that (R1+R2)/(R1−R2) is higher than the upper limit of the expression (9), it becomes difficult to correct the sagittal flare.

The numerical ranges of the expressions (4) to (9) may be set to ranges illustrated in the following expressions (4a) to (9a):

$$1.88 \le ndpl \le 2.08 \quad (4a)$$
$$1.1 \le fm/f \le 1.9 \quad (5a)$$
$$0.01 \le |f/ff| \le 0.35 \quad (6a)$$
$$0.02 \le |sk/fr| \le 0.17 \quad (7a)$$
$$28 \le vdnl \le 47 \quad (8a)$$
$$-9.0 \le (R1+R2)/(R1-R2) \le -0.5 \quad (9a)$$

The numerical ranges of the expressions (4) to (9) may be ranges illustrated in the following expressions (4b) to (9b):

$$1.90 \le ndpl \le 2.06 \quad (4b)$$
$$1.2 \le fm/f \le 1.8 \quad (5b)$$
$$0.02 \le |f/ff| \le 0.30 \quad (6b)$$
$$0.04 \le |sk/fr| \le 0.14 \quad (7b)$$
$$30 \le vdnl \le 45 \quad (8b)$$
$$-8.0 \le (R1+R2)/(R1-R2) \le -1.0 \quad (9b)$$

Next follows a more specific description of the optical system according to each example.

Example 1

An optical system according to Example 1 illustrated in FIG. 1 includes, in order from the object side to the image side, a first lens unit L1 having a positive refractive power, a second lens unit L2 having a positive refractive power, and a third lens unit L3 having a negative refractive power. An aperture stop (diaphragm) SP is disposed in the second lens unit L2. During focusing from an object at infinity to a short distance object, the second lens unit L2 moves to the object side.

Figure 2:
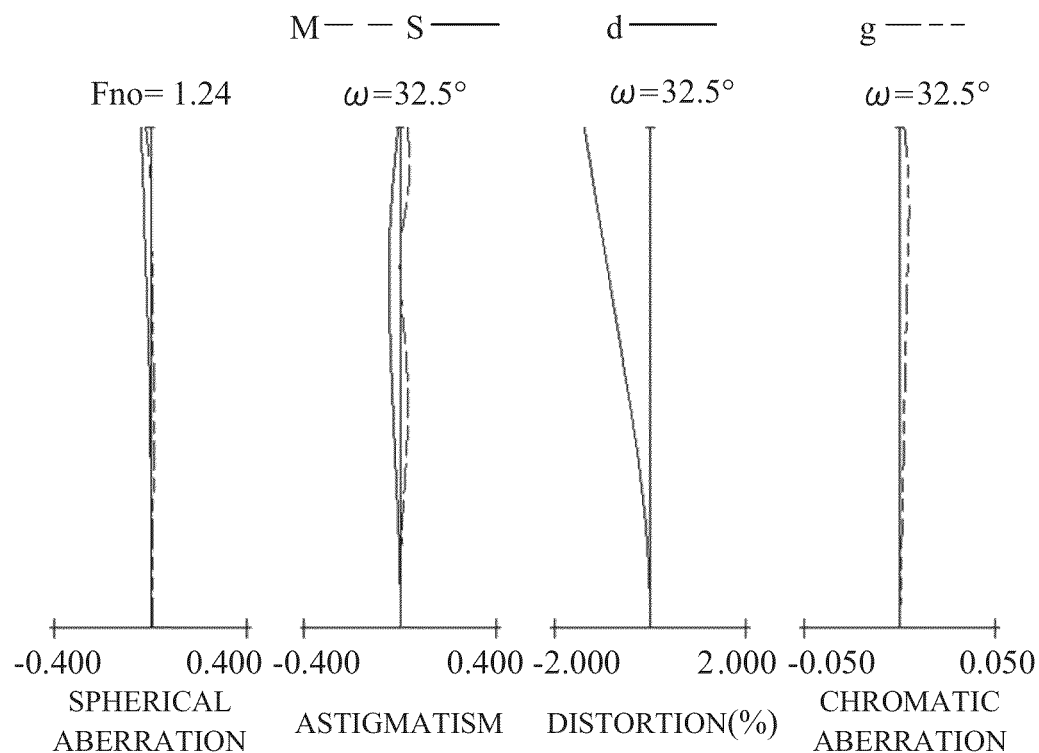
FIG. 2 is a longitudinal aberration diagram of the optical system according to Example 1 in an in-focus state on infinity.
Figure 3:
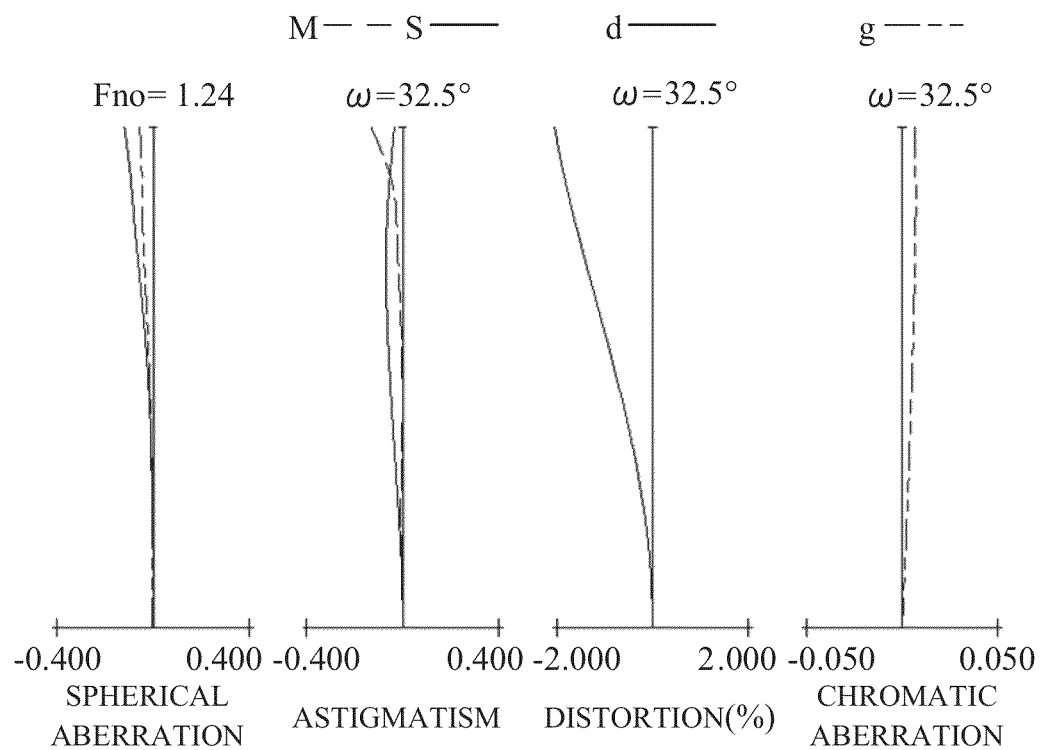
FIG. 3 is a longitudinal aberration diagram of the optical system according to Example 1 in an in-focus state on a short distance.

The optical system according to this example has a wide angle and a large aperture ratio, but is compact and can satisfactorily correct various aberrations at all object distances as illustrated in the aberration diagrams in FIGS. 2 and 3.

Example 2

An optical system according to Example 2 illustrated in FIG. 4 includes, in order from the object side to the image side, a first lens unit L1 having a positive refractive power, a second lens unit L2 having a positive refractive power, and a third lens unit L3 having a negative refractive power. An aperture stop (diaphragm) SP is disposed in the second lens unit L2. During focusing from an object at infinity to a short distance object, the second lens unit L2 moves to the object side, and the third lens unit L3 moves to the object side so that the distance between the third lens unit L3 and the second lens unit L2 increases.

Figure 5:
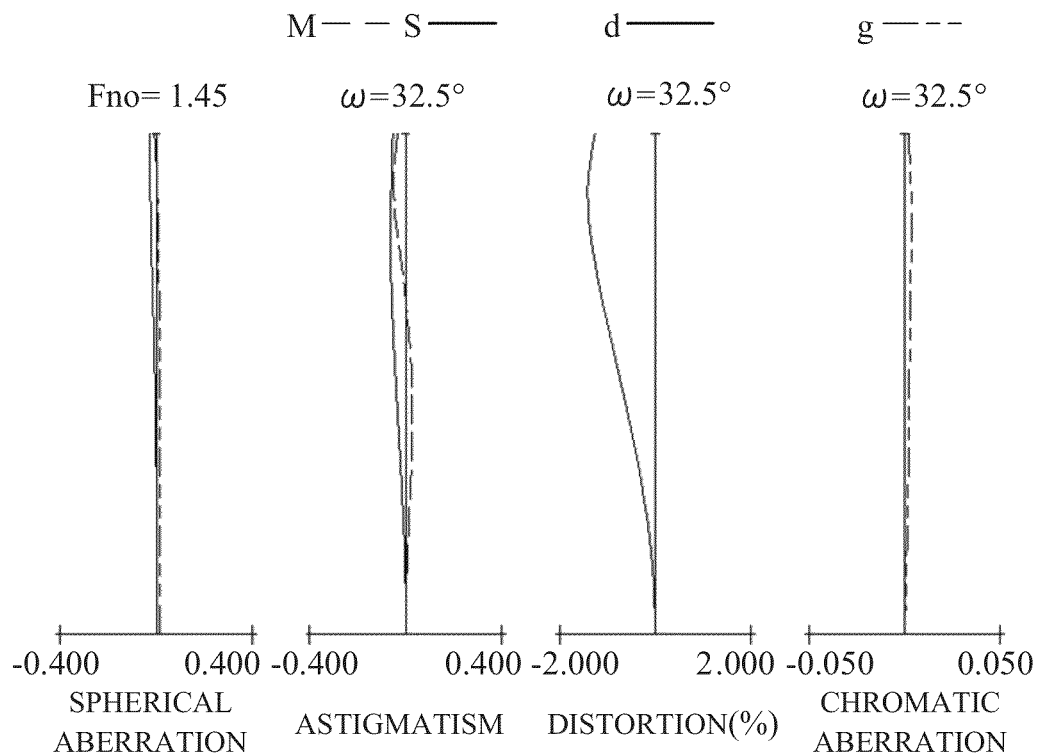
FIG. 5 is a longitudinal aberration diagram of the optical system according to Example 2 in an in-focus state on infinity.
Figure 6:
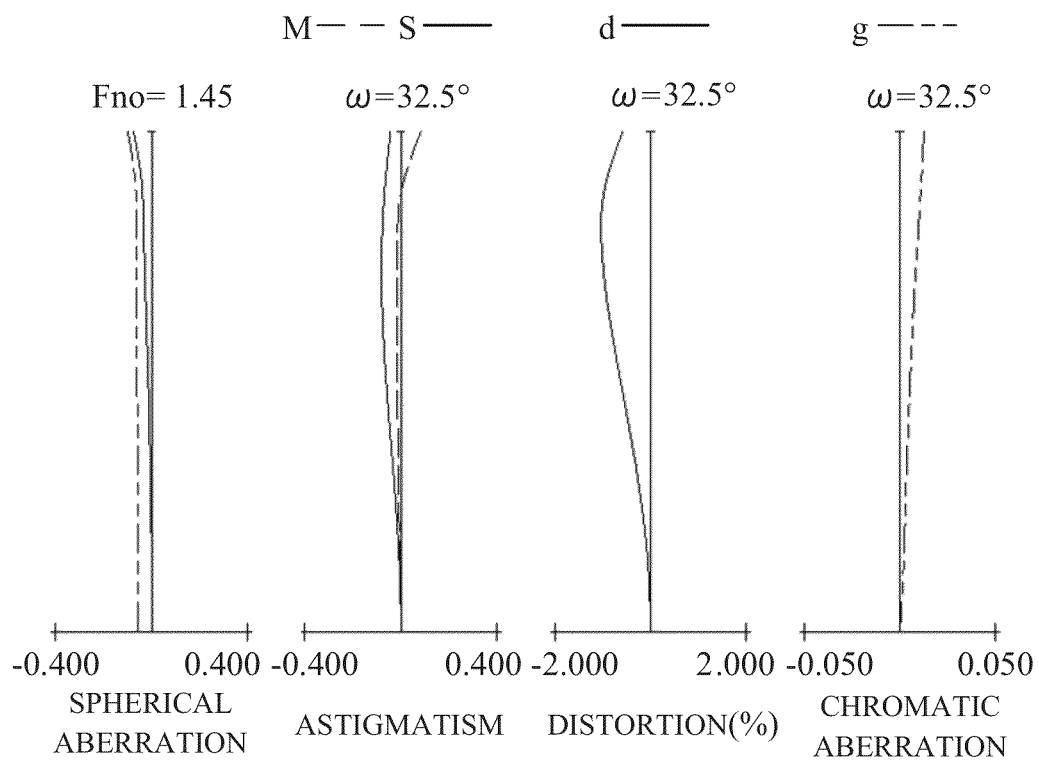
FIG. 6 is a longitudinal aberration diagram of the optical system according to Example 2 in an in-focus state on a short distance.

The optical system according to this example has a wide angle and a large aperture ratio, but is compact and can satisfactorily correct various aberrations at all object distances as illustrated in the aberration diagrams in FIGS. 5 and 6.

Example 3

An optical system according to Example 3 illustrated in FIG. 7 includes, in order from the object side to the image side, a first lens unit L1 having a positive refractive power, a second lens unit L2 having a positive refractive power, and a third lens unit L3 having a negative refractive power. An aperture stop (diaphragm) SP is disposed on the image side of the first lens unit L1. During focusing from an object at infinity to a short distance object, the second lens unit L2 moves to the object side.

Figure 8:
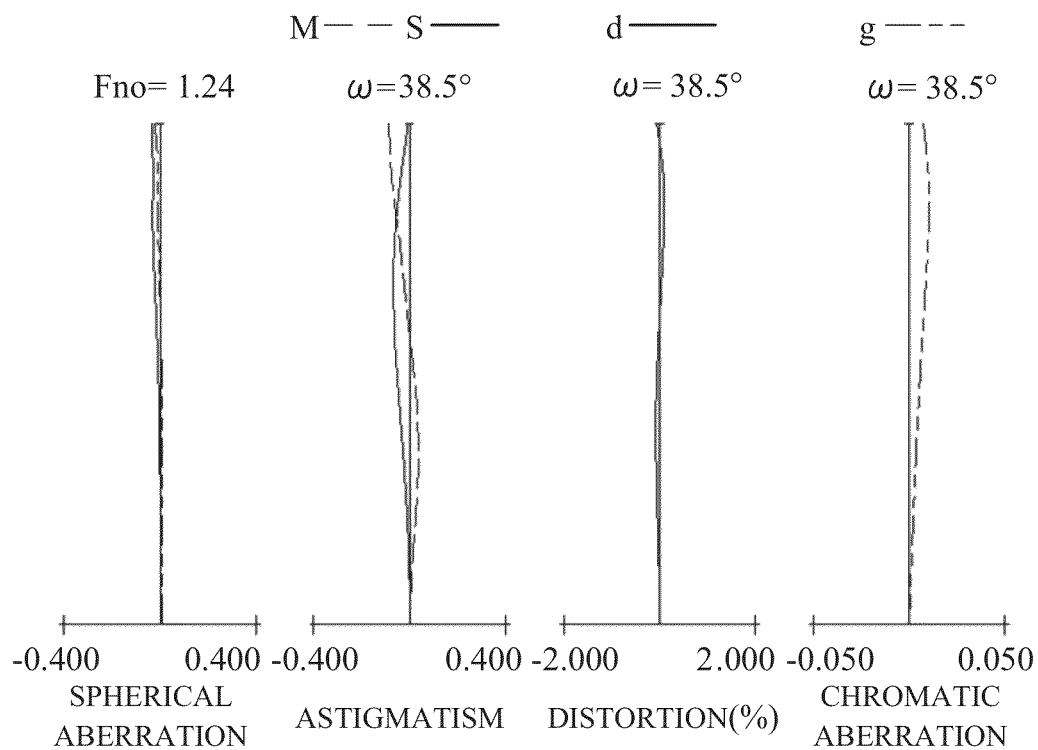
FIG. 8 is a longitudinal aberration diagram of the optical system according to Example 3 in an in-focus state on infinity.
Figure 9:
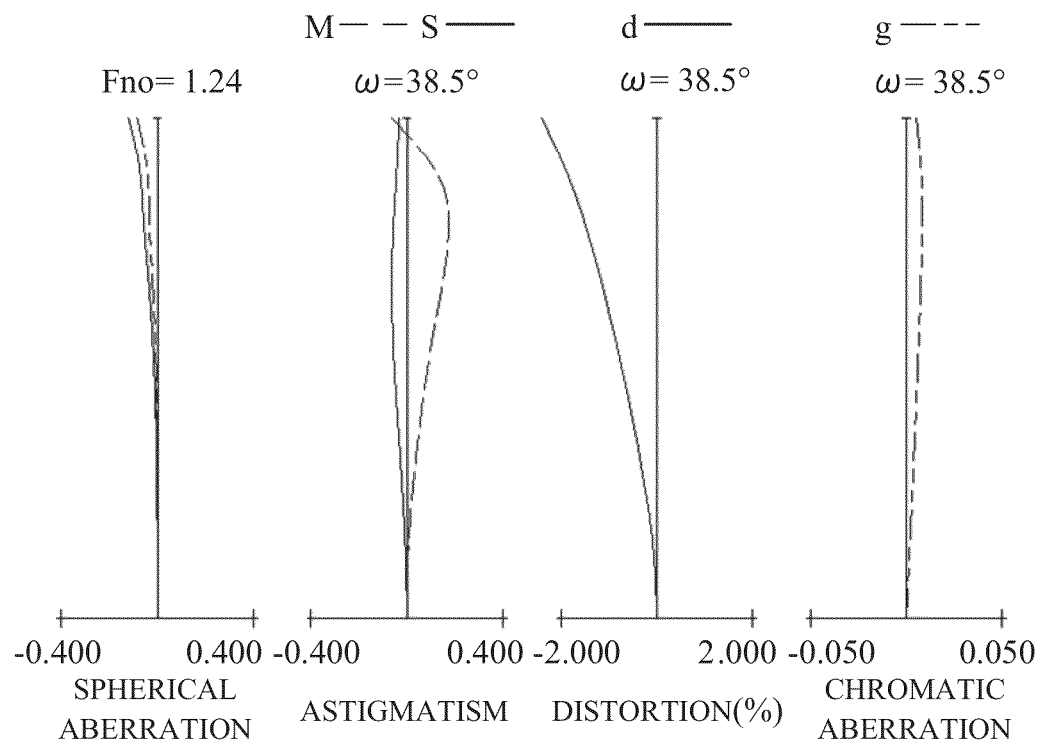
FIG. 9 is a longitudinal aberration diagram of the optical system according to Example 3 in an in-focus state on a short distance.

The optical system according to this example has a wide angle and a large aperture ratio, but is compact and can satisfactorily correct various aberrations at all object distances as illustrated in the aberration diagrams in FIGS. 8 and 9.

Example 4

Figure 10:
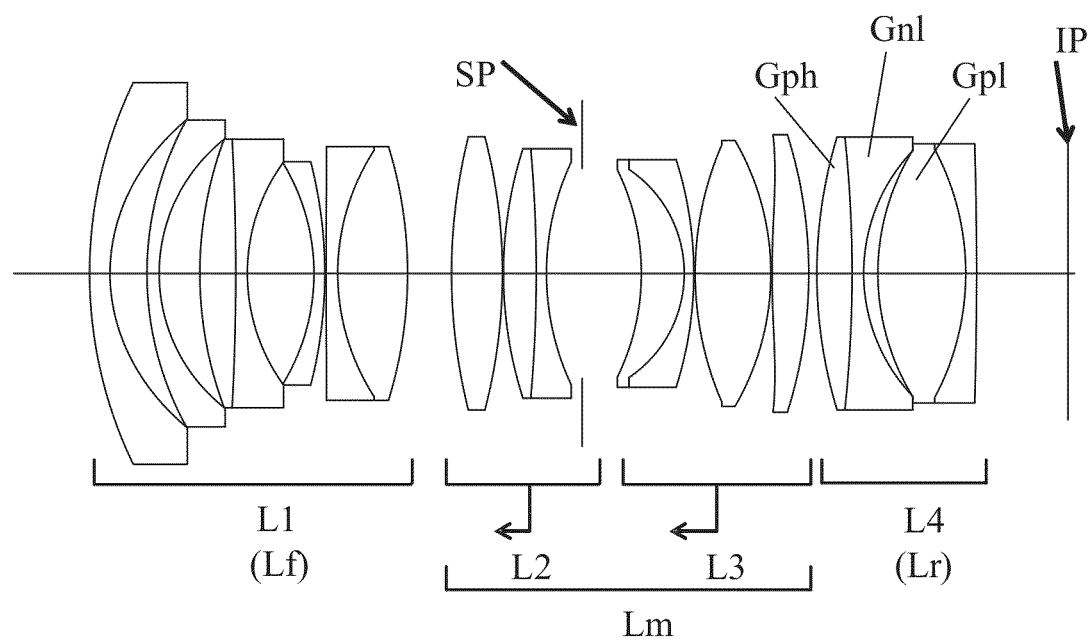
FIG. 10 is a sectional view of an optical system according to Example 4.

An optical system according to Example 4 illustrated in FIG. 10 includes, in order from the object side to the image side, a first lens unit L1 having a negative refractive power, a second lens unit L2 having a positive refractive power, a third lens unit L3 having a positive refractive power, and a fourth lens unit L4 having a negative refractive power. An aperture stop (diaphragm) SP is disposed between the second lens unit L2 and the third lens unit L3. During focusing from an object at infinity to a short distance object, the second lens unit L2 moves to the object side, and the third lens unit L3 moves to the object side so that the distance between the third lens unit L3 and the second lens unit L2 decreases.

Figure 11:
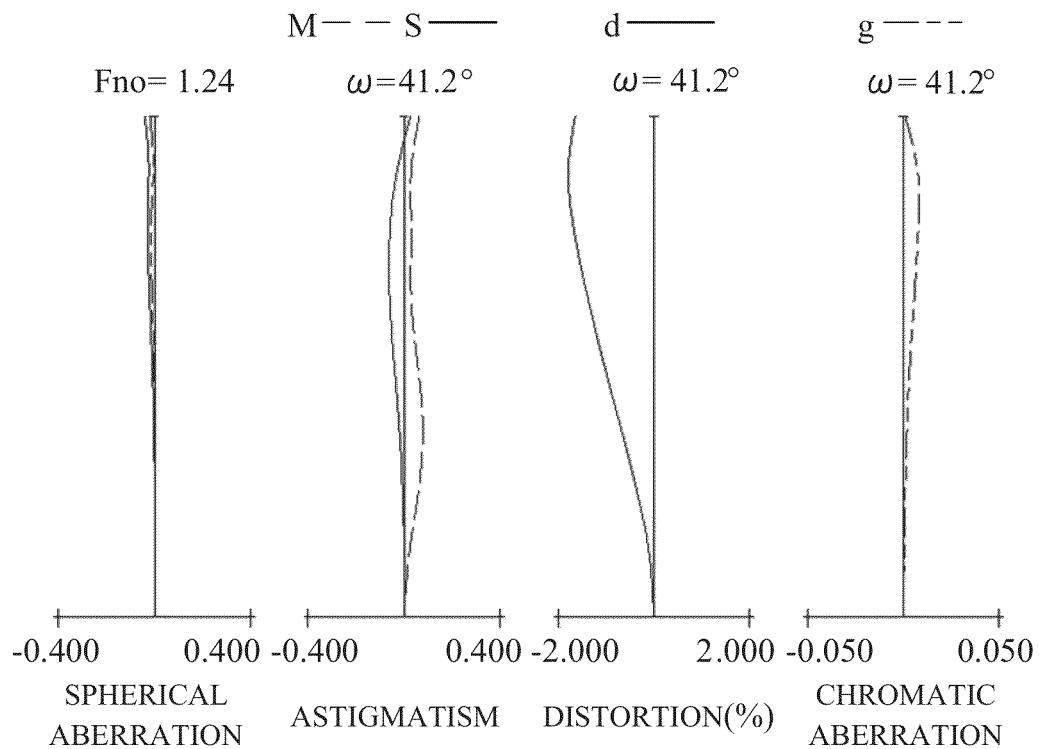
FIG. 11 is a longitudinal aberration diagram of the optical system according to Example 4 in an in-focus state on infinity.
Figure 12:
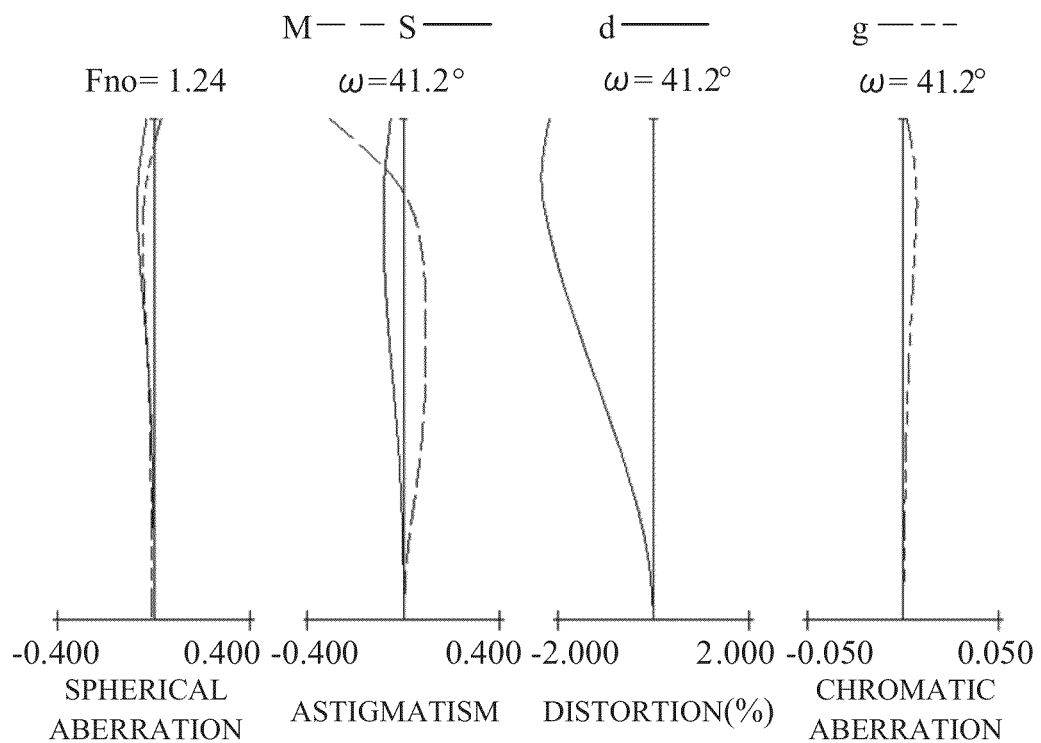
FIG. 12 is a longitudinal aberration diagram of the optical system according to Example 4 in an in-focus state on a short distance.

The optical system according to this example has a wide angle and a large aperture ratio, but is compact and can satisfactorily correct various aberrations at all object distances as illustrated in the aberration diagrams in FIGS. 11 and 12.

Numerical examples 1 to 4 corresponding to Examples 1 to 4 will now be given. In the surface data in each numerical example, r represents a radius of curvature of each optical surface, and d (mm) represents an axial distance (distance on the optical axis) between an m-th plane and an (m+1)-th plane. However, m is a surface number counted from the light incident side. nd represents a refractive index of each optical element for the d-line, and vd represents an Abbe number of the optical element. The Abbe number vd of the optical element is expressed as vd=(Nd−1)/(NF−NC) where Nd, NF, and NC are refractive indexes for the d-line (587.6 nm), the F-line (486.1 nm), and the C-line (656.3 nm) in the Fraunhofer line.

In each numerical example, all of the axial distance d (mm), focal length (mm), F-number, and half angle of view (°) have values when the optical system is in focus on an object at infinity. The backfocus BF is a distance from the final lens surface to the image plane. The overall lens length, which indicates the overall length of the optical system, is a value obtained by adding backfocus to the distance from the first lens surface to the final lens surface.

When the optical surface is an aspherical surface, the symbol * is added to the right side of the surface number. The aspherical shape is expressed as follows:

$$x = (h^2/R)/[1 + \{1 - (1+k)(h/R)^2\}^{1/2} + A4 \times h^4 + A6 \times h^6 + A8 \times h^8 + A10 \times h^{10} + A12 \times h^{12}$$

where X is a displacement amount from the surface vertex in the optical axis direction, h is a height from the optical axis in the direction orthogonal to the optical axis, R is a paraxial radius of curvature, k is a conical constant, A4, A6, A8, A10, and A12 are aspherical coefficients of each order. "e±XX" in each aspherical surface coefficient means "$\times 10^{\pm XX}$".

In addition, the values of the conditions of the expressions (1) to (9) in each example (numerical example) will be summarized in Table 1.

Numerical Example 1

UNIT mm

Surface data

| surface number | r | d | nd | vd | effective diameter |
|---|---|---|---|---|---|
| 1 | 125.457 | 3.00 | 1.58313 | 59.4 | 55.24 |
| 2* | 26.747 | 19.23 | | | 44.84 |
| 3 | −46.592 | 1.90 | 1.66565 | 35.6 | 44.18 |
| 4 | 110.744 | 8.76 | 2.05090 | 26.9 | 46.93 |
| 5 | −64.565 | 3.12 | | | 47.18 |
| 6 | −41.338 | 2.00 | 1.85478 | 24.8 | 47.03 |
| 7 | −82.810 | 0.20 | | | 48.98 |
| 8 | 144.476 | 12.92 | 1.76385 | 48.5 | 49.70 |
| 9 | −40.675 | 2.00 | 1.85478 | 24.8 | 49.50 |
| 10 | −64.396 | 8.73 | | | 49.50 |
| 11 | 58.201 | 5.82 | 1.95375 | 32.3 | 46.25 |
| 12 | 685.542 | 0.15 | | | 45.54 |
| 13 | 39.004 | 9.23 | 1.43875 | 94.7 | 40.23 |
| 14 | −124.064 | 1.70 | 1.73800 | 32.3 | 37.93 |
| 15 | 27.192 | 7.61 | | | 31.68 |
| 16(diaphragm) | ∞ | 7.49 | | | 30.86 |
| 17 | −34.760 | 5.52 | 1.43875 | 94.7 | 29.51 |
| 18 | −19.548 | 1.40 | 1.72047 | 34.7 | 29.66 |
| 19 | −114.254 | 0.20 | | | 32.51 |
| 20 | 77.625 | 8.92 | 1.43875 | 94.7 | 34.11 |
| 21 | −34.513 | 0.20 | | | 35.15 |
| 22* | 170.198 | 6.40 | 1.85135 | 40.1 | 38.68 |
| 23 | −58.632 | 1.20 | | | 39.56 |
| 24 | 66.386 | 4.84 | 1.95375 | 32.3 | 39.99 |
| 25 | −497.270 | 1.70 | 1.61340 | 44.3 | 39.62 |
| 26 | 31.640 | 3.76 | | | 36.79 |
| 27 | 71.096 | 8.30 | 1.43875 | 94.7 | 36.88 |
| 28 | −45.403 | 1.60 | 1.72047 | 34.7 | 36.95 |
| 29 | 2329.439 | 17.05 | | | 37.92 |
| image plane | ∞ | | | | |

ASPHERIC DATA
Second surface

K = 0.00000e+000 A 4 = −2.00450e−006 A 6 = −1.32033e−009
A 8 = −8.45871e−012 A10 = 1.57614e−014 A12 = −2.16397e−017
Twenty-second surface K = 0.00000e+000 A 4 = −4.34292e−006 A 6 = 5.62945e−010
A 8 = −2.80610e−012 A10 = 2.56213e−015 A12 = −2.64844e−018

VARIOUS DATA

| Focal length | 34.00 |
|---|---|
| F-NUMBER | 1.24 |
| Half angle of view | 32.47 |
| Image height | 21.64 |
| Overall lens length | 154.96 |
| BF | 17.05 |

LENS UNIT DATA

| Unit | Starting surface | Focal length |
|---|---|---|
| 1 | 1 | 209.90 |
| 2 | 11 | 55.88 |
| 3 | 24 | −278.05 |

Numerical Example 2

UNIT mm

Surface data

| surface number | r | d | nd | vd | effective diameter |
|---|---|---|---|---|---|
| 1 | 305.560 | 2.60 | 1.58313 | 59.4 | 48.78 |
| 2* | 26.693 | 7.22 | | | 40.53 |
| 3 | 111.981 | 2.78 | 2.00100 | 29.1 | 40.42 |
| 4 | 1598.387 | 6.26 | | | 40.10 |
| 5 | −41.621 | 1.70 | 1.54072 | 47.2 | 39.39 |
| 6 | 309.463 | 0.77 | | | 39.62 |
| 7 | 56.088 | 10.76 | 1.76385 | 48.5 | 40.08 |
| 8 | −43.941 | 1.70 | 1.85478 | 24.8 | 39.47 |
| 9 | −76.336 | 7.05 | | | 38.71 |
| 10 | 53.699 | 2.92 | 1.76385 | 48.5 | 32.16 |
| 11 | 184.069 | 0.15 | | | 31.81 |
| 12 | 27.287 | 3.94 | 1.91082 | 35.3 | 30.14 |
| 13 | 56.989 | 1.40 | 1.73800 | 32.3 | 29.08 |
| 14 | 19.071 | 9.30 | | | 25.38 |
| 15(diaphragm) | ∞ | 4.96 | | | 24.13 |
| 16 | −25.785 | 6.78 | 1.49700 | 81.5 | 23.53 |
| 17 | −15.125 | 1.20 | 1.72047 | 34.7 | 24.11 |
| 18 | −56.302 | 0.20 | | | 26.55 |
| 19 | 67.909 | 10.53 | 1.43875 | 94.7 | 32.89 |
| 20 | −28.975 | 0.20 | | | 34.85 |
| 21* | 299.811 | 5.45 | 1.85135 | 40.1 | 37.38 |
| 22 | −55.256 | 1.20 | | | 38.18 |
| 23 | 48.414 | 6.49 | 1.95375 | 32.3 | 38.48 |
| 24 | −211.500 | 1.70 | 1.73800 | 32.3 | 37.83 |
| 25 | 25.843 | 6.03 | | | 33.67 |
| 26 | 191.537 | 8.12 | 1.49700 | 81.5 | 33.91 |
| 27 | −35.708 | 1.60 | 1.61340 | 44.3 | 34.57 |
| 28 | 341.250 | 12.96 | | | 36.45 |
| image plane | ∞ | | | | |

ASPHERIC DATA
Second surface

K = 0.00000e+000 A 4 = −2.71577e−006 A 6 = −2.69024e−009
A 8 = −2.38740e−012 A10 = −1.21757e−016 A12 = −1.60572e−019

Twenty-first surface

K = 0.00000e+000 A 4 = −6.07205e−006 A 6 = 1.22182e−011
A 8 = −5.33869e−012 A10 = 6.11074e−015 A12 = −1.22548e−017

VARIOUS DATA

| Focal length | 34.00 |
|---|---|
| F-NUMBER | 1.45 |
| Half angle of view | 32.47 |
| Image height | 21.64 |
| overall lens length | 125.96 |
| BF | 12.96 |

LENS UNIT DATA

| Unit | Starting surface | Focal length |
|---|---|---|
| 1 | 1 | 814.22 |
| 2 | 10 | 42.60 |
| 3 | 23 | −126.84 |

Numerical Example 3

UNIT mm

Surface data

| surface number | r | d | nd | vd | effective diameter |
|---|---|---|---|---|---|
| 1 | 89.640 | 3.00 | 1.58313 | 59.4 | 51.79 |
| 2* | 22.589 | 10.50 | | | 39.89 |
| 3 | 154.709 | 1.80 | 1.43875 | 94.7 | 39.58 |
| 4 | 51.963 | 2.45 | | | 38.09 |
| 5 | 137.008 | 4.99 | 2.05090 | 26.9 | 38.06 |
| 6 | −80.946 | 1.90 | 1.60342 | 38.0 | 37.73 |
| 7 | 78.372 | 7.71 | | | 35.01 |
| 8 | −31.876 | 2.00 | 1.84666 | 23.8 | 34.77 |
| 9 | −53.441 | 0.20 | | | 36.23 |
| 10 | 206.499 | 11.57 | 1.80400 | 46.5 | 36.56 |
| 11 | −25.972 | 2.00 | 1.67270 | 32.1 | 37.61 |
| 12 | −68.758 | 3.54 | | | 39.52 |
| 13 | 84.804 | 4.83 | 2.05090 | 26.9 | 39.95 |
| 14 | −182.815 | 0.15 | | | 39.65 |
| 15 | 58.378 | 7.41 | 1.43875 | 94.7 | 36.56 |
| 16 | −63.460 | 1.70 | 1.73800 | 32.3 | 35.13 |
| 17 | 40.508 | 7.38 | | | 31.75 |
| 18(diaphragm) | ∞ | 9.21 | | | 31.00 |
| 19 | −43.165 | 6.62 | 1.43875 | 94.7 | 29.83 |
| 20 | −19.537 | 1.40 | 1.73800 | 32.3 | 30.05 |
| 21 | −69.041 | 0.20 | | | 32.97 |
| 22 | 55.118 | 10.36 | 1.43875 | 94.7 | 35.84 |
| 23 | −38.085 | 0.20 | | | 37.28 |
| 24* | 305.015 | 5.39 | 1.85135 | 40.1 | 39.02 |
| 25 | −60.849 | 1.20 | | | 39.70 |
| 26 | 79.861 | 6.81 | 2.05090 | 26.9 | 39.52 |
| 27 | −73.677 | 1.70 | 1.73800 | 32.3 | 39.06 |
| 28 | 33.208 | 2.95 | | | 35.02 |
| 29 | 68.856 | 12.74 | 1.43875 | 94.7 | 35.05 |
| 30 | −24.165 | 1.60 | 1.83400 | 37.2 | 34.84 |
| 31 | −107.315 | 13.45 | | | 37.55 |
| image plane | ∞ | | | | |

ASPHERIC DATA
Second surface

K = 0.00000e+000 A 4 = −2.51278e−006 A 6 = −4.93581e−009
A 8 = −9.79334e−012 A10 = 2.74976e−014 A12 = −7.88423e−017

Twenty-fourth surface

K = 0.00000e+000 A 4 = −5.43925e−006 A 6 = −2.67844e−010
A 8 = 1.15219e−012 A10 = −1.07823e−014 A12 = 1.07650e−017

VARIOUS DATA

| Focal length | 27.15 |
|---|---|
| F-NUMBER | 1.24 |
| Half angle of view | 38.55 |
| Image height | 21.64 |
| overall lens length | 146.96 |
| BF | 13.45 |

LENS UNIT DATA

| Unit | Starting surface | Focal length |
|---|---|---|
| 1 | 1 | 114.19 |
| 2 | 19 | 40.15 |
| 3 | 26 | −182.13 |

Numerical Example 4

UNIT mm

Surface data

| surface number | r | d | nd | vd | effective diameter |
|---|---|---|---|---|---|
| 1 | 65.059 | 3.00 | 1.58313 | 59.4 | 54.97 |
| 2* | 26.502 | 5.44 | | | 44.28 |
| 3 | 47.172 | 1.80 | 1.65844 | 50.9 | 44.00 |
| 4 | 25.291 | 5.99 | | | 38.53 |
| 5 | 56.673 | 5.29 | 2.05090 | 26.9 | 38.36 |

-continued

UNIT mm

| 6 | −365.182 | 1.70 | 1.49700 | 81.5 | 37.55 |
| 7 | 28.121 | 9.81 | | | 31.64 |
| 8 | −31.467 | 1.60 | 1.67270 | 32.1 | 31.14 |
| 9 | −66.341 | 0.20 | | | 31.67 |
| 10 | 3316.110 | 1.70 | 1.71736 | 29.5 | 31.46 |
| 11 | 33.562 | 10.28 | 1.83481 | 42.7 | 35.05 |
| 12 | −63.767 | 6.46 | | | 36.15 |
| 13 | 83.416 | 7.50 | 1.83481 | 42.7 | 39.04 |
| 14 | −79.688 | 0.15 | | | 38.80 |
| 15 | 60.729 | 4.83 | 1.59522 | 67.7 | 35.56 |
| 16 | −209.237 | 1.50 | 1.73800 | 32.3 | 34.66 |
| 17 | 39.046 | 5.25 | | | 31.62 |
| 18(diaphragm) | ∞ | 8.71 | | | 31.02 |
| 19 | −34.967 | 6.32 | 1.43875 | 94.7 | 29.30 |
| 20 | −18.606 | 1.40 | 1.73800 | 32.3 | 29.47 |
| 21 | −55.555 | 0.20 | | | 32.32 |
| 22 | 48.077 | 11.14 | 1.43875 | 94.7 | 36.68 |
| 23 | −39.194 | 0.20 | | | 37.95 |
| 24* | 152.779 | 5.38 | 1.85135 | 40.1 | 39.20 |
| 25 | −68.287 | 1.18 | | | 39.70 |
| 26 | 69.690 | 5.19 | 1.92286 | 20.9 | 39.01 |
| 27 | −193.154 | 1.70 | 1.73800 | 32.3 | 38.54 |
| 28 | 26.395 | 2.09 | | | 34.95 |
| 29 | 34.751 | 12.93 | 1.43875 | 94.7 | 35.13 |
| 30 | −39.169 | 1.60 | 1.83400 | 37.2 | 35.44 |
| 31 | −655.657 | 13.45 | | | 36.96 |
| image plane | ∞ | | | | |

ASPHERIC DATA
Second surface

K = 0.00000e+000 A 4 = −2.05881e−006 A 6 = −5.00184e−009
A 8 = −2.62387e−012 A10 = 8.51559e−015 A12 = −2.42125e−017
Twenty-fourth surface K = 0.00000e+000 A 4 = −6.24099e−006 A 6 = −7.48924e−010
A 8 = −2.25523e−012 A10 = −3.99031 e−015 A12 = 1.50873e−018

VARIOUS DATA

| Focal length | 24.74 |
| F-NUMBER | 1.24 |
| Half angle of view | 41.17 |
| Image height | 21.64 |
| overall lens length | 143.97 |
| BF | 13.45 |

LENS UNIT DATA

| Unit | Starting surface | Focal length |
| --- | --- | --- |
| 1 | 1 | −98.85 |
| 2 | 13 | 40.10 |
| 3 | 26 | −115.11 |

TABLE 1

| | | EXAMPLE | | | |
| --- | --- | --- | --- | --- | --- |
| | | 1 | 2 | 3 | 4 |
| CONDI- | (1) −0.40 ≤ f/fr ≤ 0.00 | −0.12 | −0.27 | −0.15 | −0.21 |
| TIONAL | (2) 65 ≤ vdpl | 94.66 | 81.54 | 94.66 | 94.66 |
| EXPRES- | (3) 0.00 ≤ | fpl/fr | ≤ 0.60 | 0.23 | 0.48 | 0.23 | 0.39 |
| SION | (4) 1.85 ≤ ndph ≤ 2.10 | 1.95 | 1.95 | 2.05 | 1.92 |
| | (5) 1.0 ≤ fm/f ≤ 2.0 | 1.64 | 1.25 | 1.48 | 1.62 |
| | (6) 0.00 ≤ | f/ff | ≤ 0.40 | 0.16 | 0.04 | 0.24 | 0.25 |
| | (7) 0.00 ≤ | sk/fr | ≤ 0.20 | 0.06 | 0.10 | 0.07 | 0.12 |
| | (8) 25 ≤ vdnl ≤ 50 | 34.71 | 32.33 | 32.33 | 32.33 |
| | (9) −10.0 ≤ (R1 + R2)/(R1 − R2) ≤ 0.0 | −2.60 | −1.31 | −2.96 | −7.32 |

Figure 13:
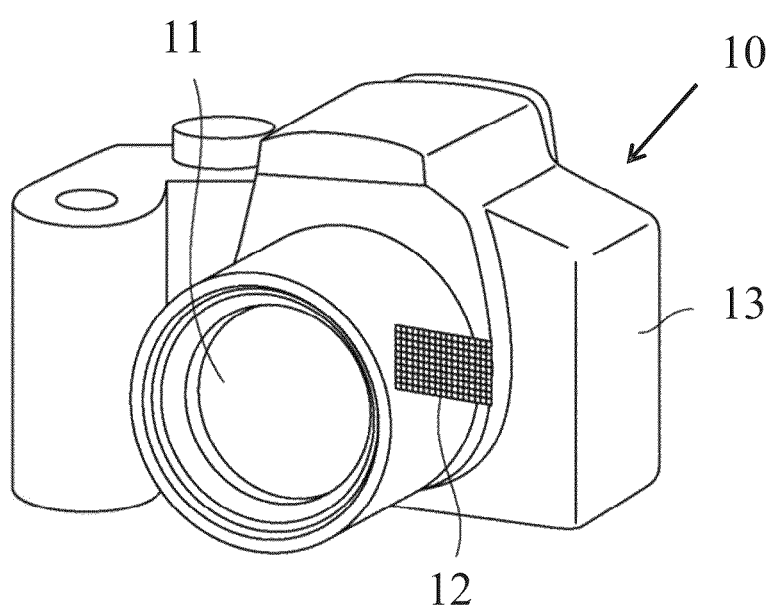
FIG. 13 is a schematic view of an image pickup apparatus.

FIG. 13 illustrates a digital still camera (image pickup apparatus) using the optical system according to each example as an imaging optical system. The camera has a camera body 10 and an imaging optical system 11 including one of the optical systems according to Examples 1 to 4. The camera body 10 contains a solid-state image sensor (photoelectric conversion element) 12, such as a CCD sensor and a CMOS sensor, which captures an optical image formed by the imaging optical system 11.

The camera body 10 may be a single-lens reflex camera having a quick return mirror, or a mirrorless camera having no quick return mirror.

By using the optical system according to each example for an imaging optical system for an image pickup apparatus such as a digital still camera, it is possible to realize an image pickup apparatus having a compact lens unit (imaging optical system) and a high optical performance.

The above examples can realize an optical system that can satisfactorily correct various aberrations while having a large aperture ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-223914, filed on Dec. 11, 2019 which is hereby incorporated by reference herein in its entirety.

What is claimed is:

1. An optical system with a fixed focal length comprising:
a front lens unit closest to an object;
a rear lens unit having a negative refractive power closest to an image plane; and
a middle group having a positive refractive power as a whole, including one or more lens units, and disposed between the front lens unit and the rear lens unit,
wherein a distance between adjacent lens units changes during focusing,
wherein the front lens unit includes four or more lenses,
wherein the middle group includes three or more positive lenses and one or more negative lenses,
wherein the rear lens unit consists of two positive lenses and two negative lenses, and
wherein the following inequality is satisfied:

$$-0.40 \leq f/fr < 0.00$$

where f is a focal length of the optical system, and fr is a focal length of the rear lens unit.

2. The optical system according to claim 1, wherein the following inequality is satisfied:

$$1.85 \leq ndpl \leq 2.10$$

where ndpl is a refractive index of a positive lens having the largest refractive index in the rear lens unit.

3. The optical system according to claim 1, wherein the following inequality is satisfied:

$$1.0 \leq fm/f \leq 2.0$$

where fm is a focal length of the middle group.

4. The optical system according to claim 1, wherein the following inequality is satisfied:

$$0.00 < |f/f\!f| \le 0.40$$

where ff is a focal length of the front lens unit.

5. The optical system according to claim 1, wherein the following inequality is satisfied:

$$0.00 < |sk/fr| \le 0.20$$

where sk is a backfocus of the optical system when the optical system is in focus on an object at infinity.

6. The optical system according to claim 1, wherein the front lens unit has a negative lens closest to the object.

7. The optical system according to claim 1, wherein the following inequality is satisfied:

$$25 \le vdnl \le 50$$

where vdnl is an Abbe number of a negative lens having the smallest Abbe number in the rear lens unit.

8. The optical system according to claim 1, wherein the rear lens unit includes an air lens having a negative refractive power, and
wherein the following inequality is satisfied:

$$-10.0 \le (R1 + R2)/(R1 - R2) < 0.0$$

where R1 is a radius of curvature of a surface on an object side of the air lens, and R2 is a radius of curvature of a surface on the image side of the air lens.

9. The optical system according to claim 1, wherein the front lens unit is fixed during focusing.

10. The optical system according to claim 1, wherein the rear lens unit is fixed during focusing.

11. The optical system according to claim 1, wherein the front lens unit and the rear lens unit are fixed during focusing, and the middle group includes a lens unit configured to move during focusing.

12. The optical system according to claim 11, wherein a lens unit configured to move during focusing moves toward an object side during focusing from infinity to a short distance.

13. The optical system according to claim 1, wherein the middle group consists of one lens unit configured to move during focusing.

14. The optical system according to claim 1, wherein the middle group includes two lens units configured to move on different trajectories during focusing.

15. An image pickup apparatus comprising:
an optical system with a fixed focal length; and
an image sensor configured to capture an image formed by the optical system,
wherein the optical system includes:
a front lens unit closest to an object;
a rear lens unit having a negative refractive power closest to an image plane; and
a middle group having a positive refractive power as a whole, including one or more lens units, and disposed between the front lens unit and the rear lens unit,
wherein a distance between adjacent lens units changes during focusing,
wherein the front lens unit includes four or more lenses,
wherein the middle group includes three or more positive lenses and one or more negative lenses,
wherein the rear lens unit consists of two positive lenses and two negative lenses, and
wherein the following inequality is satisfied:

$$-0.40 \le f/fr < 0.00$$

where f is a focal length of the optical system, and fr is a focal length of the rear lens unit.

16. An optical system with a fixed focal length comprising:
a front lens unit closest to an object;
a rear lens unit having a negative refractive power closest to an image plane; and
a middle group having a positive refractive power as a whole, including two lens units, and disposed between the front lens unit and the rear lens unit,
wherein a distance between adjacent lens units changes during focusing,
wherein the middle group includes three or more positive lenses and one or more negative lenses,
wherein the rear lens unit consists of two positive lenses and two negative lenses,
wherein the two lens units in the middle group are configured to move on different trajectories during focusing, and
wherein the following inequality is satisfied:

$$-0.40 \le f/fr < 0.00$$

where f is a focal length of the optical system, and fr is a focal length of the rear lens unit.

* * * * *